(No Model.)
J. SCHNEIBLE.
GLUE CUTTING AND SPREADING MACHINE.
No. 282,930. Patented Aug. 7, 1883.
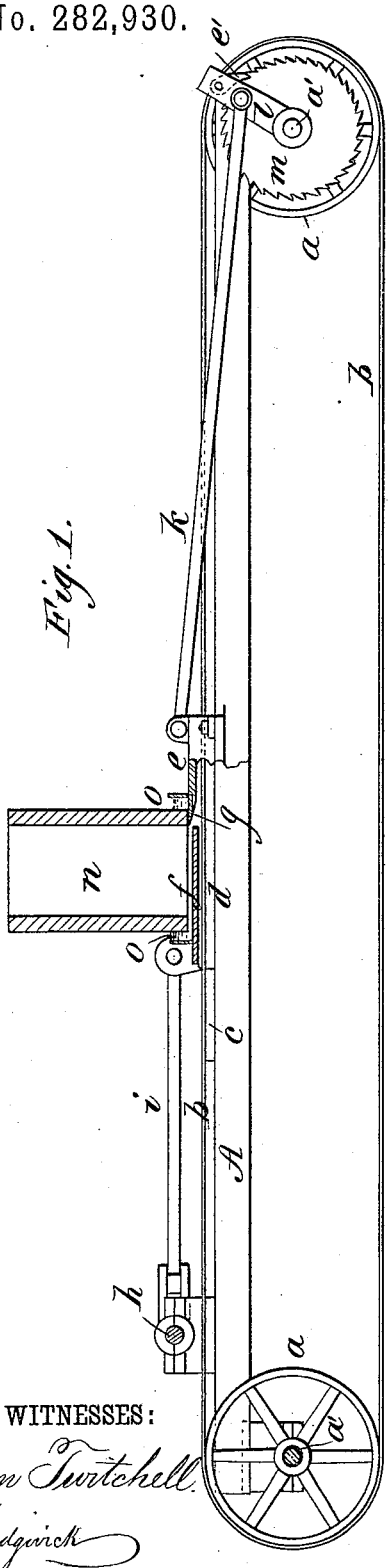
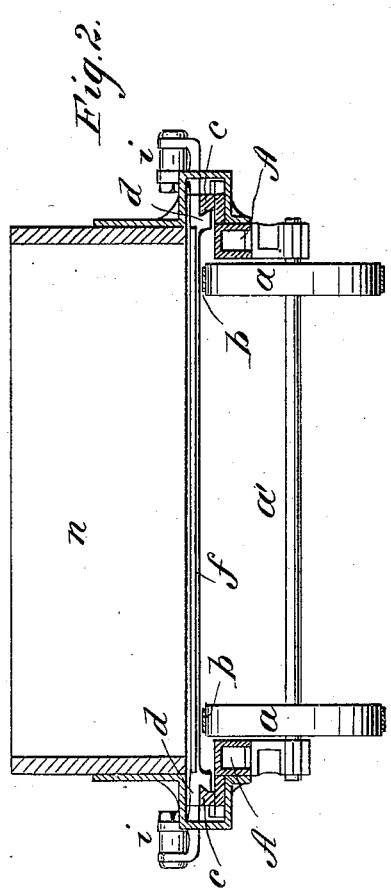
WITNESSES:
Dom Twitchell
C. Sedgwick
INVENTOR:
J. Schneible
BY Munn & Co
ATTORNEYS.

UNITED STATES PATENT OFFICE.

JOSEPH SCHNEIBLE, OF ST. LOUIS, MISSOURI, ASSIGNOR OF ONE-HALF TO P. B. MATHIASON, OF SAME PLACE.

GLUE CUTTING AND SPREADING MACHINE.

SPECIFICATION forming part of Letters Patent No. 282,930, dated August 7, 1883.

Application filed April 18, 1883. (No model.)

*To all whom it may concern:*

Be it known that I, JOSEPH SCHNEIBLE, of St. Louis, in the State of Missouri, have invented a new and Improved Glue Cutting and Spreading Machine, of which the following is a full, clear, and exact description.

My invention relates to machines for slicing and spreading glue-jelly preparatory to drying; and it consists in the combination of a reciprocating cutter with the jelly-box and a traveling-belt-carrying frame for receiving the slices as cut by the knife, as hereinafter described and claimed.

Reference is to be had to the accompanying drawings, forming part of this specification, in which similar letters of reference indicate corresponding parts in both the figures.

Figure 1 is a partly-sectional side view of the machine, and Fig. 2 is a cross-section of the same.

A A are side bars of the supporting-frame, fitted at the ends with cross-shafts $a'$, carrying pulleys $a\ a$, around which are endless belts $b\ b$.

$c\ c$ are slideways upon the bars A; and $d\ d$ are slides carrying a cross-plate, $e$, and also a plate, $f$, to which plate $e$ is attached a knife or cutter, $g$, the cutting-edge of which is at the edge of the plate $f$, and above the same the thickness of the slices to be cut.

$h$ is a cross-shaft fitted in boxes on bars A, and near one end thereof, and provided with cranks at its ends, which connect by rods $i$ to the slides $d$.

From the opposite ends of the slides rods $k$ pass to loose arms $l$ on the shaft at the opposite end of the machine, and the arms $l$ carry pawls $l'$, that engage ratchet-wheels $m$, fixed on the shaft, so that, the shaft $h$ being revolved, the slides, with plates $e\ f$, are reciprocated, and at the backward movement of the cutter the pawls engage the ratchet-wheels, and belts $b$ are moved a distance equal to the movement of the knife.

The jelly-box $n$ is fixed to side bars, A, by brackets at its ends, as shown in Fig. 2, and is placed above the cutter and the plate $e$, so that when the plate $f$ is drawn out from beneath the box the plate $e$ takes its place for holding up the block of jelly.

In operation the block of jelly is placed in box $n$, resting on plate $e$. A frame provided with netting—such as is used for drying glue—is placed on belts $b$ beneath the box, and the shaft $h$ being rotated by power, the cutter moves forward and cuts a slice from the jelly. The plate $f$ at the same time moving away, the slice passes upon the frame, and the return movement taking place, plate $f$ is carried beneath the jelly-block, and the belts being at the same time moved, the frame is carried forward in position for receiving the next slice apart from the first one. In this manner, as slice after slice is cut, they are spread on the frame, and the frames when filled are carried to the end of the machine for removal. The plate $f$ is adjustable, so as to vary the thickness of the slices cut.

The box may be divided into cells of any size desired, so that each movement of the knife will cut a slice from the bottom of each cell, and the box extending the full width of the drying-frames, all the slices cut at once will be properly spread.

In order to keep the plates $e\ f$ moist, so as to prevent the glue-jelly from sticking thereto, there are fitted at the sides of jelly-box $n$ open-bottomed boxes $o$, containing fibrous material soaked with water, which, resting on plates $e\ f$, keeps their surfaces moist.

This machine saves the troublesome and expensive work of spreading the jelly by hand, as has been heretofore practiced.

The knife is to be attached to plate $e$ in any suitable manner, and the surface of plate $f$ may be corrugated, so as to slide on the jelly more readily.

Having thus described my invention, I claim as new and desire to secure by Letters Patent—

1. The machine for cutting and spreading glue, consisting of reciprocating slides $d$, plates $e\ f$, carried by the slides, cutter $g$, fixed jelly-box $n$, and belts $b$, having an intermittent forward movement, substantially as described, combined for operation as specified.

2. In glue-cutting machines, the combination, with box $n$, of reciprocating slides $d$, plates $e\ f$, and cutter $g$, substantially as described.

3. In glue-cutting machines, the combination, with box $n$, reciprocating plates $e\ f$, and cutter *g*, of the endless belts *b*, substantially as described.

4. In glue-cutters, the combination of slides *d*, carrying the cutter *g*, belts *b*, pulleys *a*, ratchet-wheels *m*, pawl-arms *l*, and rods *k*, substantially as described, for operation as specified.

5. In glue-cutters, the boxes *o*, combined with jelly-box *n* and reciprocating plates *e f*, substantially as and for the purpose specified.

JOSEPH SCHNEIBLE.

Witnesses:
 WILLIAM A. CLISBEE,
 LOUIS R. D'ESTOUVILLE.